June 3, 1924.

L. L. PERKINS

SAFETY SIDE LIGHT FOR AUTOMOBILES

Filed April 25, 1922

1,496,488

INVENTOR.
Linus L. Perkins
BY H. G. Manning
ATTORNEY

Patented June 3, 1924.

1,496,488

UNITED STATES PATENT OFFICE.

LINUS L. PERKINS, OF WINSTED, CONNECTICUT.

SAFETY SIDE LIGHT FOR AUTOMOBILES.

Application filed April 25, 1922. Serial No. 556,512.

*To all whom it may concern:*

Be it known that I, LINUS L. PERKINS, a citizen of the United States, and a resident of Winsted, county of Litchfield, and State of Connecticut, have invented certain new and useful Improvements in Safety Side Lights for Automobiles, of which the following is a specification.

This invention relates to automobile side lamps and more particularly to a safety lamp adapted to be positioned upon the wind-shield for illuminating the left-hand side of the car and the adjacent ground, so that passing cars or pedestrians will be able to get by with less danger of accidents.

One object of this invention is to provide a device which will present a colored light in front of the car, as well as intensely illuminate the left-hand side of the car and the adjacent ground.

A further object is to provide a device of this nature which will be simple, easy to manipulate, cheap to manufacture, and very efficient and durable in use.

With these and other objects in view, there has been illustrated on the accompanying drawings one form in which the invention may be conveniently embodied in practice.

Figure 1:
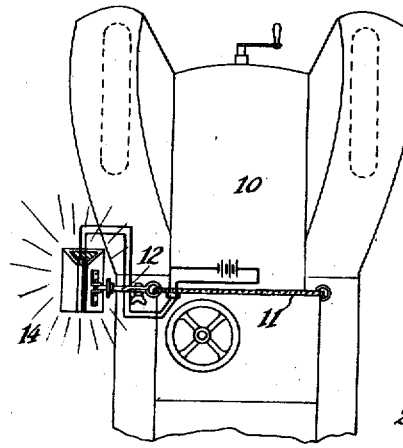
Fig. 1 represents a top plan view partly in section of the forward part of an automobile equipped with the present invention.

In driving at night with automobiles having the present system of head-lights, many collisions and other accidents take place, due largely to the blinding effect upon the drivers of cars going in one direction by the head-lights of the cars approaching from the other direction. This blinding effect has for many years continued to be one of the most serious problems connected with motor car traffic, and all legislative efforts to eliminate it by means of head-light laws have been fruitless. Thousands of head-on and rear-end collisions occur annually, and many pedestrians are maimed or killed, due to this cause alone.

One method which has been tried out for avoiding the blinding effect of the head-lights, was for the drivers of two approaching cars to dim their lights when within a reasonable distance of each other. This method has not been entirely successful in reducing accidents in the past, because of the well-known fact that the blinding effect upon a driver persists for a considerable period even after the head-lights of an approaching car have been turned off or dimmed. Moreover, under such conditions, when the driver dims his own head-lights, it becomes extremely difficult for him to see the left-hand side of an approaching car. This is especially true if for any reason, the left-hand head-light of such a car happens to be "dead".

With the present system, the above and other disadvantages have been largely avoided. This has been accomplished by providing a safety lamp upon the left-hand side of the car, which is adapted to be switched on when meeting an approaching car. When lighted, the safety lamp will intensely illuminate the entire left-hand portion of the car below the lamp, including the running board and mud-guard. It will also illuminate the adjacent roadway and the ditch, and all objects at the side of the road for a considerable distance without in any way blinding or dazzling the occupants of the approaching car. It will also illuminate any pedestrians who may happen to be walking on the right-hand side of the road and who otherwise might be invisible.

Referring now to the drawings, in which like reference numerals denote corresponding parts throughout the several views, the numeral 10 denotes the forward part of a motor car having the invention applied thereto. Mounted on the left-hand side of the wind-shield 11 by means of a universal bracket, generally denoted by the numeral 12, is an adjustable safety lamp 14 of relatively high candle power. The lamp 14, as more clearly shown in Figs. 3 to 5, comprises a casing including a lower bulb compartment 15 and an upper housing 16, connected to which are a pair of insulated wires 17 by means of a plug 18 detachably carried in a socket 19 in the end of the housing. The wires 17 are connected in any suitable manner to a switch button 20 on the dash board within easy reach of the driver.

The switch for the safety lamp may be arranged to operate independently of the switch for the head-lights, or, if desired, the mechanism may be so connected that the head-lights will be automatically dimmed when the safety lamp is switched on.

Figure 3:
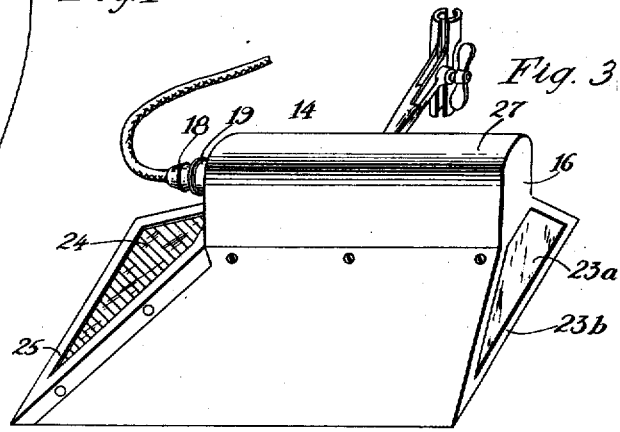
Fig. 3 is a perspective view of the safety lamp, and the universal bracket for attaching it to the left-hand wind-shield support.
Figure 2:
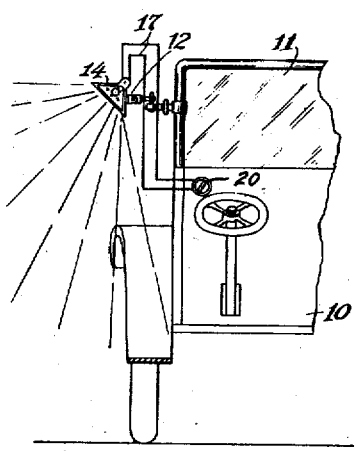
Fig. 2 is a rear elevation of the same, also partly in section.
Figure 4:
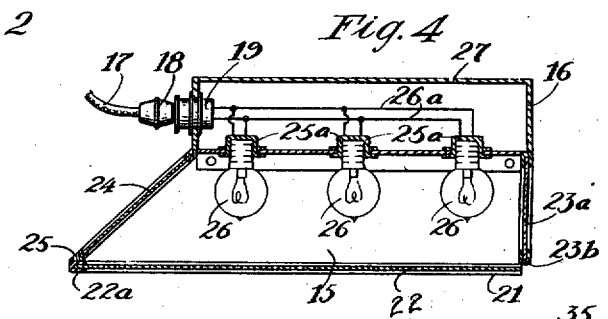
Fig. 4 is a side sectional view of the safety lamp, showing the interior construction thereof.
Figure 5:
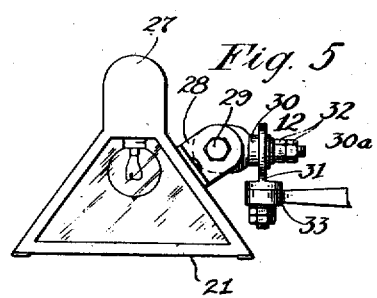
Fig. 5 is a rear view of the safety lamp and a portion of the universal bracket for attaching it to the wind-shield.

The lamp casing comprises an open rectangular flat base 21 provided with a glass window 22 held in position by means of a three-sided retaining flange 22ª, or in any other suitable manner. The casing is also provided with a front glass window 24 held in place by a flange 25 inclined rearwardly as shown in Figs. 3 and 4, and having its top and bottom edges parallel, and its side edges converging to the housing 16. The glass of the window 24 may be green, amber, or any other desired color, according to the laws of the particular state where the car is to be operated. The purpose of this colored window is to identify the left-hand side of the car to all passers-by.

Mounted within a plurality of sockets 25ª carried by the bottom of the housing 16 are the incandescent bulbs 26 of high candle power adapted to strongly illuminate the side of the car including the entire running board and the front mud guard, as well as the adjacent road and objects on the side of the road. These bulbs are preferably connected in parallel by suitable wires 26ª to the socket 19 previously described. The housing 16 is substantially rectangular in section, but is provided with a curved top section 27 as clearly shown in Figs. 3 and 5.

Figure 6:
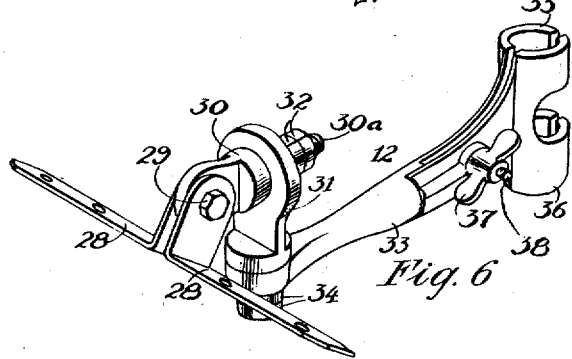
Fig. 6 is a perspective view of the universal supporting bracket shown detached from the remainder of the apparatus.

The rear of the lamp casing is provided with an open glass window 23ª held in position by means of the supporting flange 23ᵇ, as clearly shown in Figs. 3 and 4. The universal bracket for adjustably securing the safety lamp to the wind-shield support of the car, as most clearly shown in Figs. 5 and 6, comprises a pair of angle arms 28 with their base portions riveted to the inner inclined side of the casing, and pivoted by means of a bolt 29 to a horizontal member 30, said horizontal member 30 being provided with a reduced cylindrical section 30ª threaded at its inner end and locked to an intermediate vertical member 31 by means of the nuts 32, 32, threaded upon said outer end 30ª of the horizontal member 30. The vertical intermediate member has its lower end reduced to form a cylindrical bearing section threaded at its lower end, upon which a horizontal wind-shield clamp 33 is adapted to be pivoted and adjustably locked by means of a pair of locking nuts 34, 34. The inner end of the wind-shield clamp is composed of two cooperating opposed semi-tubular elongated clamping jaws 35 and 36, adapted to be detachably held together by means of a wing-nut 37 threaded upon a bolt 38 secured to the clamping jaw 35.

As will be evident, the universal joint thus described permits the lamp to be adjustably held in any position, so as to direct the rays of the light upon the car and the adjacent ground at any desired angle.

In operation, when two cars equipped with this invention have approached within a reasonable distance, say two hundred feet, both drivers will dim their head-lights and at the same time switch on their safety lamps. The car will thus be enabled to pass one another with a minimum danger of collision or of injury to pedestrians who may be walking at the side of the road, and who would be out of the range of the ordinary illumination from said cars.

In order to reduce the danger of sideswiping from cars coming up from the rear, it may be found desirable in some cases to keep the safety lamp lighted continuously. In most cases, however, it will generally be sufficient for the driver to switch on the safety lamp when he hears the horn of the car approaching from the rear. It will thus be seen that this invention insures the highest degree of safety to the occupants of the car, and if universally adopted would result in a great saving of life and property, since approaching drivers would always have a clear vision of the left-hand side of the car, and would thus be able to pass by easily.

One advantage of the present invention is that a car can operate with safety, even though the left-hand or both head-lights have gone "dead" which often occurs, due to short or open circuits, or other unavoidable causes. It will be understood that it is not essential that the bracket be mounted upon the wind-shield in all cases, but that if desired, it may be mounted upon any other suitable part of the left-hand side of the car back of the forward wheels. Moreover, it will be understood that when it is desired to install the safety lamp upon a closed car, it will not generally be feasible to attach it to the wind-shield, but it may be located on the outside of the car in any convenient place.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

A safety light for intensely illuminating the side of a vehicle, and the adjacent roadway, so as to permit other vehicles approaching from any direction to pass by with safety, comprising a substantially rectangular housing for a source of light, a casing depending from said housing, said casing comprising a pair of opaque inclined side sections, an inclined colored transparent front section, a horizontal colorless transparent base, and a vertical colorless transparent rear section.

In testimony whereof, I have affixed my signature to this specification.

LINUS L. PERKINS.